United States Patent Office 2,730,529
Patented Jan. 10, 1956

2,730,529
SPIROCYCLIC ESTERS OF SULPHUROUS ACID AND THEIR USE AS PEST COMBATTING AGENTS

Karl Gätzi and Paul Müller, Basel, Switzerland, assignors to J. R. Geigy A. G., Basel Switzerland, a Swiss firm No Drawing. Application May 14, 1954,
Serial No. 429,972

Claims priority, application Switzerland May 22, 1953

6 Claims. (Cl. 260—340.9)

This invention is concerned with new diesters of sulphurous acid with spirocyclic alcohols on the one hand and chloralkanols on the other. It has been found that such compounds of the general formula:

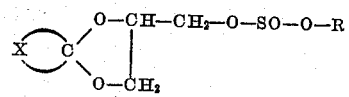

wherein X represents a divalent saturated hydrocarbon radical with from 4 to 17 carbon atoms which together with the quaternary C atom forms a 5- to 7-membered ring and which can also be substituted by halogen or lower alkoxy groups, and R represents a chlorosubstituted alkyl radical containing 2 to 3 carbon atoms, have a marked toxic action on insects and mites, in particular, on spider mites. At the same time, these compounds are relatively non-toxic to warm blooded animals so that they are excellently suitable as active ingredients for the production of pest combatting agents, in particular for the combatting of mites.

Diesters of sulphurous acid of the general formula given above can be produced by reacting a spirocyclic alcohol of the general formula:

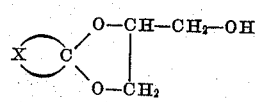

with a chloralkyl chlorosulphite of the general formula:

R—O—SO—Cl in the presence of an acid binding agent. Tertiary organic bases such as pyridine, triethylamine, dimethylaniline etc. are particularly suitable as acid binding agents; the reaction is performed with advantage in indifferent solvents and diluents such as ether, benzene etc.

The spirocyclic alcohols themselves are easily obtained by a method known per se by acetalising cycloaliphatic ring ketones with glycerine by means of acid condensation agents such as, e. g. concentrated hydrochloric acid or hydrogen chloride in the warm. It is advantageous to perform this reaction in a solvent which enables the continual removal by azeotropic distillation of the water formed on the acetalisation. Toluene and similar benzene hydrocarbons are excellently suitable for this purpose.

The divalent saturated hydrocarbon radical X can be a divalent aliphatic radical with a straight or a branched chain or it can also be a divalent cycloaliphatic radical according to the type of the ketone forming the base of the spirocyclic alcohol. Because of their easier accessibility, derivatives of five-membered ring and six-membered ring ketones are preferred but ketones of the next higher ring system can also be used. Radicals X with a straight chain are obtained, e. g. when cyclobutanone, cyclopentanone, cyclohexanone or cycloheptanone are used for the acetalisation with glycerol, while those with a branched chain are obtained, e. g. from 3.5.5-trimethylcyclohexanone, from monocyclic terpenes such as menthone and carvomenthone as well as from easily accessible hydrogenation products of mono- and poly-alkylated phenols and from phenyl phenols such as, e. g. methyl cyclohexanones, 2- and 4-isobutyl- and tertiary butyl-cyclohexanone, 4-amyl- 4-nonyl- and 4-dodecyl-cyclohexanone, or 2- and 4-cyclohexylcyclohexanone. Cycloaliphatic radicals X are obtained, e. g. from bicyclic terpenes such as camphor, fenchone and carone, as well as from decalones.

Compounds with the halogenated radical X are obtained, e. g. starting from 2-bromocyclopentanone, 2-chloro- and 2-bromo-cyclohexanone and dibromomenthone. Starting materials for the production of compounds, the radical X of which contains alkoxy groups are obtained from hydrogenation products of mono-alkyl ethers of dihydroxybenzenes, e. g. from 2-methoxycyclohexanone, 3-ethoxycyclohexanone, 2-butoxy-, 3-butoxy- or 4-butoxycyclohexanone.

The chloralkyl-chlorosulphites of the general formula

R—O—SO—Cl result from the addition at a low temperature of low molecular chloralkanols to thionyl chloride. The low molecular chloralkanols of the general formula:

R—OH can contain a primary or secondary hydroxyl group and one or more chlorine atoms, naturally however, not at the same carbon atom as the hydroxyl group. As single chloralkanols can be named, e. g. β-chlorethanol, β.β.β-trichlorethanol, β-chloro- and γ-chloro-propanol, β-chlorisopropanol, β.γ-dichloropropanol, β.β'-dichlorisopropanol.

The following examples illustrate the production of the new compounds. Parts are given as parts by weight and their relationship to parts by volume is as that of grammes to cubic centimetres. The temperatures are given in degrees centigrade.

Example 1

94 parts of technical glycerol are heated with 400 parts by volume of toluene under reflux with a water separator until the solution is completely anhydrous. At boiling temperature 154 parts of 4-tertiary butyl cyclohexanone are added in portions within 2 hours and at the same time 3 parts by volume of concentrated hydrochloric acid are added dropwise. The whole is kept boiling until the greater part of the calculated amount of water has been removed (19 parts instead of the 20 theoretical parts). The reaction solution is then evaporated at 60° (bath temperature) in the vacuum, the residue is dissolved in ether and the ethereal solution is washed with water and diluted soda solution. 1.4-dioxa-8-tert. butyl-spiro-[4.5]-decyl-(2)-methanol boils at 155–159° under 14 mm. pressure. The yield is 86% of the theoretical.

22.8 parts of this 1.4-dioxa-8-tert. butyl-spiro-[4.5]-decyl-(2)-methanol and 10 parts of anhydrous pyridine are dissolved in 200 parts by volume of anhydrous ether, cooled to 0–5° and then added dropwise while stirring well to a solution of 20 parts of β-chlorethyl-chlorosulphite in 20 parts by volume of abs. ether. After a reacting time of 5 hours at 0–5°, the reaction mixture is diluted with water, the reaction product is dissolved in ether and washed with diluted hydrochloric acid, water, diluted sodium bicarbonate solution and then again with water. {1.4-dioxa-8-tert. butyl-spiro-[4.5]-decyl-(2)-methyl}-(β-chlorethyl)-sulphite boils at 161–163° under 0.2 mm. pressure and it is a fairly thin oil.

Example 2

26 parts of β.β'-dichloro-isopropyl chlorosulphite dissolved in 20 parts by volume of anhydrous ether are added dropwise within one hour at 0–5° to a solution of 17.2 parts of 1.4-dioxa-spiro-[4.5]-decyl-(2)-methanol, produced from cyclohexanone and glycerol, and 10 parts of anhydrous pyridine in 200 parts by volume of anhydrous ether. On working up as described in Example 1, {1.4 - dioxa-spira-[4.5]-decyl-(2)-methyl}-(β.β'-dichloro-isopropyl)-sulphite is obtained as an oil. It boils at 151–153° under 0.1 mm. pressure.

*Example 3*

The following spirocyclic alcohols and the chlorethyl sulphurous acid esters thereof can be produced for example according to the process described in Example 1.

| No. | | B. P. and mm. Hg pressure for— | |
|---|---|---|---|
| | | Y=OH (spirocyclic alcohols) | Y=—O—SO—O—CH$_2$CH$_2$Cl |
| 1 | 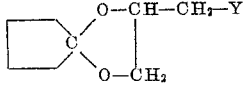 | 114–116°/11 | 120–122°/0.1. |
| 2 | 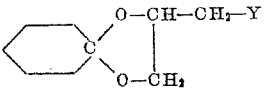 | 123–127°/12 | 130–136°/0.1. |
| 3 | 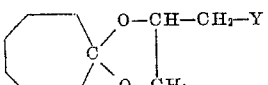 | 137–140°/13 | 139–143°/0.1. |
| 4 | 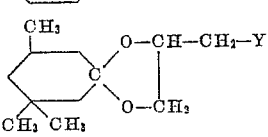 | 140–142°/14 | 141–145°/0.2. |
| 5 | 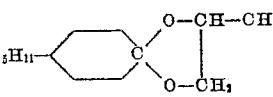 | 175–179°/14 | 168–172°/0.2. |
| 6 | 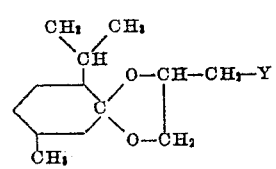 | 148–152°/14 | 143–145°/0.05. |
| 7 | 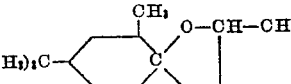 | 123–126°/0.1 | 159–161°/0.1. |
| 8 | 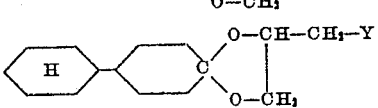 | 125–127°/0.1 | molecular distillation at 0.01 mm. 150° bath temp. |
| 9 | 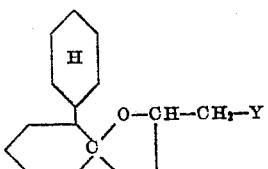 | 133–140°/0.2 | Do. |
| 10 | 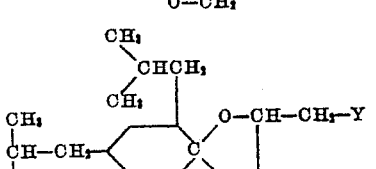 | 117–120°/0.3 | 171–174°/0.3. |
| 11 | 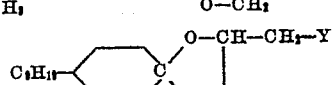 | 142–147°/0.3 | 202–203°/0.2. |
| 12 | 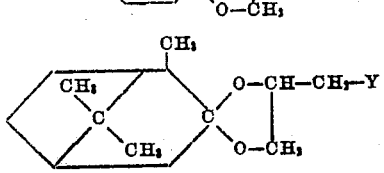 | 97–101°/0.2 | 150–151°/0.1. |

| No. | Structure | B. P. and mm. Hg pressure for— | |
|---|---|---|---|
| | | Y=OH (spirocyclic alcohols) | Y=—O—SO—O—CH$_2$CH$_2$Cl |
| 13 | (Cl-substituted cyclohexyl spiro dioxolane with O—CH—CH$_2$—Y and O—CH$_2$) | 152–154°/14 | 161–162°/0.1. |
| 14 | (OCH$_2$CH$_3$-substituted cyclohexyl spiro dioxolane with O—CH—CH$_2$—Y and O—CH$_2$) | 125–131°/13 | 144–151°/0.2. |
| 15 | (OCH$_2$CH$_2$CH$_3$-substituted cyclohexyl spiro dioxolane with O—CH—CH$_2$—Y and O—CH$_2$) | 110–114°/0.2 | molecular distillation at 0.001 mm. and 120° bath temperature. |
| 16 | CH$_3$CH$_2$CH$_2$CH$_2$—O—(cyclohexyl spiro dioxolane with O—CH—CH$_2$—Y and O—CH$_2$) | 122–124°/0.2 | 164–166°/0.05. |
| 17 | (OCH$_2$CH$_2$CH$_2$CH$_3$-substituted cyclohexyl spiro dioxolane with O—CH—CH$_2$—Y and O—CH$_2$) | 118–128°/0.2 | 158–160°/0.1. |

In the combatting of pests, in particular mites which are injurious to plants, the new compounds can be used as such or, which is more often more advantageous, they can be combined with the usual pulverulent, semi-solid (ointment-like), liquid or gaseous carriers so that they are more closely adapted to the intended use. Both solutions and also emulsions and suspensions are suitable as combinations with liquid carriers; by combinations with gaseous carriers are meant aerosols such as are obtained by mixing the active ingredient, if necessary with the help of a solvent, with propelling agents such as difluoro-dichlormethane or methyl chloride, which are gaseous under normal pressure and temperature.

The active component itself can consist of one or more compounds of the formula defined. It can also be combined for use with other acaricidal, insecticidal, ovicidal, fungicidal or bactericidal substances. As such can be named for example: α.α-bis-(chlorophenyl)-β.β.β-trichlorethane or -β.β-dichlorethane, 1.2.4.5.6.7.8.8-octachloro-3a.4.7.7a - tetrahydro-4.7-methano-indane, diethyl-p-nitrophenyl thiophosphate, 5.5-dimethyl-dihydroresorcin-dimethyl carbamate, dinitrocresol, nitrated naphthylamines, mercury compounds or inorganic substances such as copper compounds, sublimate, sulphur etc. Preparations so obtained by combining substances have a large range of action.

Various methods for preparing the mite combatting agents and the use thereof are described in the further examples given below.

Example 4

1–5 parts of active ingredient, e. g. {1.4-dioxa-8-tertiary butyl-spiro-[4.5]-decyl-(2)-methyl}-(β - chlor-ethyl)-sulphite are rubbed and ground with 99–95 parts of talc until the active substance is evenly distributed over the carrier. The dusting agent so obtained has a good action against the imagines and larvae of the red spider mites, e. g. *Paratetranychus pilosus, Tetranychus urticae* etc. It can also be used to control ticks. If a mixture of talc, kaolin and ground limestone is used as carrier, products with a similar action are obtained.

Example 5

10 parts of active ingredient, e. g. {1.4-dioxa-8-cyclohexyl-spiro-[4.5]-decyl-(2)methyl}-(β - chlor-ethyl)-sulphite, are homogeneously milled with 80 parts of carrier and 10 parts of additive. Kaolin, bentonite, chalk etc. can be used as carriers and sulphite waste liquor, the sodium salt of dibutyl-naphthalene sulphonic acid as well as other wetting and adhesive agents can be used for example as additives. Such a wettable powder is used in a concentration of 0.1–1% and it has a good action on the imagines and larvae of red spiders.

Example 6

Wettable powders with insecticidal and acaricidal action are obtained if 25–50 parts of dichlorodiphenyltrichlorethane are homogeneously mixed with 5–10 parts of {1.4-dioxa-8-tertiary-butyl-spiro-[4.5]-decyl-(2)-methyl} - (β-chlor-ethyl)-sulphite and a porous, absorbent voluminous carrier, e. g. bentonite, kaolin or precipitated magnesium carbonate. In amounts of 5–10 parts, sulphite waste liquor, blood albumin and the sodium salt of dibutyl-naphthalene sulphonic acid can be used as additives. Used in a concentration of 0.05–0.5%, these compositions have a good action on the imagines and larvae of the red spider and in addition they have an insecticidal action.

Example 7

10–25 parts of active ingredient, e. g. {1.4-dioxa-8-cyclohexyl-spiro-[4.5]-decyl - (2) - methyl} - (β-chlor-ethyl)-sulphite, are dissolved in 85–65 parts of a mixture of diacetone alcohol and xylene in a ratio of 1:2 and the solution is mixed with 5–10 parts of an emulsifier. A high molecular ethylene oxide condensation product for example can be used as emulsifier. This mixture can be emulsified in water and, in a concentration of 0.1–1% has a good action on the imagines and larvae of the red spider. If the solvent is replaced by 10–30 parts of mineral oil, an agent with an increased acaricidal and ovicidal activity is obtained.

Example 8

0.1 part of active ingredient, {1.4-dioxa-8-tertiary-butyl-spiro-[4.5]-decyl-(2)-methyl}-(β-chlor-ethyl)-sulphite, is dissolved in 5–10 parts of xylene and 94.9–89.9 parts of petroleum (B. P. 180–220°) to produce a spray with an acaricidal action.

Example 9

1 part of {1.4-dioxa-8-amyl-spiro-[4.5]-decyl-(2)-methyl}-(β-chlor-ethyl)-sulphite is homogeneously ground with 5 parts of dichlorodiphenyltrichlorethane and 94 parts of talcum. This mixture as well as similar combinations, e. g. with 5.5-dimethyldihydroresorcindimethyl carbamate or other contact insecticides or also fungicides are excellently suitable for the simultaneous control of red spiders, injurious insects and fungi diseases.

Example 10

20–25 parts of dichlorodiphenyltrichlorethane and 4–6 parts of {1.4-dioxa-7.9.9-trimethyl-spiro-[4.5]-decyl-(2)-methyl}-(β-chlor-ethyl)-sulphite are dissolved in 71–59 parts of a mixture of diacetone alcohol and xylene in a ratio of 1:2 and the solution is mixed with 5–10 parts of an emulsifier of the ethylene oxide condensation product type. The solution obtained is emulsifiable and, used in a concentration of 0.3–0.5% has a good action on red spiders and at the same time excellent insecticidal activity.

What we claim is:

1. A spirocyclic ester of sulphurous acid corresponding to the general formula:

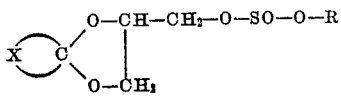

wherein R represents a chlorosubstituted alkyl radical containing not less than 2 and not more than 3 carbon atoms, and X represents a divalent, saturated hydrocarbon radical which together with the quaternary carbon atom forms a ring with not less than five and not more than seven ring members, said hydrocarbon radical containing not less than 4 and not more than 17 carbon atoms and being substituted by a member selected from the group consisting of hydrogen, halogen and lower alkoxy groups.

2. {1.4-dioxa-8-tert. butyl-spiro-[4.5]-decyl-(2)-methyl}-(β-chlor-ethyl)-sulphite.

3. {1.4-dioxa - 8 - amyl-spiro-[4.5]-decyl-(2)-methyl}-(β-chlor-ethyl)-sulphite.

4. {1.4-dioxa-8-tert. butyl-10-methyl-spiro-[4.5]-decyl-(2)-methyl}-(β-chlor-ethyl)-sulphite.

5. {1.4-dioxa - 8 - cyclohexyl - spiro-[4.5]-decyl-(2)-methyl}-(β-chlor-ethyl)-sulphite.

6. {1.4-dioxa-10-chloro-spiro - [4.5] - decyl-(2)-methyl}-(β-chlor-ethyl)-sulphite.

References Cited in the file of this patent

UNITED STATES PATENTS

| | | |
|---|---|---|
| 2,377,148 | Hechenbleikner | May 29, 1945 |
| 2,529,494 | Harris et al. | Nov. 14, 1950 |

OTHER REFERENCES

Soirbely et al.: JACS, 71, pp. 507–9 (1949).
Kuhn: J. Prakt. Chem. 156, 117–18 (1947).
Freudenberg et al.: Annalen, vol. 448, p. 126 (1926).